April 16, 1968　　　　JAMES E. WEBB　　　　3,378,315
ADMINISTRATOR OF THE NATIONAL AERONAUTICS
AND SPACE ADMINISTRATION
HYBRID LUBRICATION SYSTEM AND BEARING Filed June 17, 1965　　　　　　　　　　　　2 Sheets-Sheet 1

INVENTOR.
LEONARD S. SAUER
BY
G. T. McCoy
J. H. Warden
ATTORNEYS

United States Patent Office 3,378,315
Patented Apr. 16, 1968

3,378,315
HYBRID LUBRICATION SYSTEM AND BEARING
James E. Webb, Administrator of the National Aeronautics and Space Administration, with respect to an invention of Leonard S. Sauer, La Canada, Calif.
Filed June 17, 1965, Ser. No. 464,885
12 Claims. (Cl. 308—10)

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to journal bearings and more particularly to a means wherein a combination of standard lubricating means and a magnetic flux means provides a journal bearing adaptable to earth's atmospheric environment as well as space environment.

The important matter of providing a bearing for the severe environments of outer space has long been recognized and major efforts have been directed to this problem. The fact that conventional liquid lubricants fail is basically due to the vacuum conditions wherein lubricants outgas leaving bearing surfaces dry and thus causing ultimate failure. A second condition contributing to such failure is that the outgassing of the bearing materials themselves cause a roughening of the surfaces and the fusing or seizing of one surface to another. It is thus recognized that a successful system must be provided with some means for maintaining the surfaces separated such as is done in gas bearings. About the only known means, other than gas, that is compatible with the space environment would be magnetic flux.

Recent work relating to magnetics and the Meissner effect in relationship to superconducting materials have thrown new light on the controlling of magnetic flux fields. One such investigation and resulting system, which is significant to this invention, is directed to the production of a uniform magnetic field in various cylindrical configurations which are formed of superconducting materials. Dr. Alvin Hildebrandt and Hugo Wahlquist at the Jet Propulsion Laboratory, Pasadena, Calif., described this system in a paper published in The Journal of Applied Physics, Volume 33, No. 5, pages 1798 to 1800, dated May 1962.

About 1959, it was discovered that a cylinder made of a superconductive material could be used to trap and maintain concentrated flux fields as long as the cylinder was kept below the critical temperature of the superconductor. Hildebrandt and Wahlquist discovered further than the field being held or trapped in a thin-walled cylinder could not be made to remain uniform. In other words, it was discovered that an infinitely long, hollow superconducting cylindrical shell that has no flux trapped perpendicular to the walls has a uniform field. In practice, the length has to be finite. This has little effect for diameter to length ratio of one to four or smaller except that the currents become critical at the ends of the cylinder for a right circular shell. To avoid this, the ends were curved in a toroidal manner to keep the current and thus the field less than critical.

To be more specific, when a flux field is trapped in the cylindrical superconductor having a length to diameter ratio of over four to one, the flux lines are almost uniformly spaced near the center length of the cylinder. Near the ends of the cylinder the radially outer flux lines converge and produce a high magnetic field at the ends of the cylinder. A high magnetic field near the ends of the superconducting cylinder causes the superconducting material to become non-superconducting and then the flux lines do not follow the surface of the cylinder but may pass through the non-superconducting portions of the cylinder. The fact that superconducting materials are quite often non-homogeneous causes one part of the cylinder to become non-superconducting more quickly than another specific part of the cylinder thus causing a non-uniform control of the flux lines. This uniformity of the trapped field, of course, is very significant to the successful operation of this invention.

Upon realizing the erratic behavior of the flux lines being trapped in this thin-walled cylinder of superconducting material Hildebrandt and Walhquist sought out and determined a means for controlling this condition. The essence of their work was to provide the proper shaping of the inner surface of the cylinder to reduce maximum flux densities. The resulting configuration was a substantially toroidal shape as is shown in FIGURE 2 hereinafter.

They found that if one line of flux called a surface-of-revolution or flux tube has a certain shape then all lines located on or inside this radial periphery will have a particular shape which depends on the shape of such a line. If the inner surface of such a cylinder has the shape of this selected outer line, the flux lines on, or inside, this radius will follow the surface of the cylinder causing the entire field configuration within the superconductor to be fixed so long as no part of the cylinder becomes non-superconducting.

To be sure that no part of the cylinder will become non-superconducting even when large fields are contained, a flux line must be found which nowhere passes so close to the outer flux lines that the field becomes very large. The procedure for determining the shape of a cylinder is to first plot the shape of the flux lines of the field which must be contained in a working volume. Next, the maximum field strength along each of the flux lines is found. Then one line is chosen which is reasonably distant from the axis of the cylinder to encompass a large enough working volume, and which passes through a maximum field that is not much larger than the field contained in the working volume. One should also check to see that the cylinder will not have to follow the flux line too far in making sure that no sharp increase in field intensity will result when departing from the shape of the line. Finally, the inside of a cylinder is shaped to follow the chosen line and the inside of the cylinder is coated with a superconducting material. A cross-sectional view of such a design is shown in FIGURE 2.

Having thus recognized the value of the trapping of a uniform magnetic flux field, the inventor has applied this system as the basis of his invention.

Accordingly, an object of the invention is to provide a journal type bearing which, for all intents and purposes, can operate in a conventional manner in the atmosphere but which has been provided with means for creating a flux field and trapping such flux field between the adjacent surfaces of the journal and the spindle of the bearing when the bearing is used in outer space environments.

A second object of the invention is to provide a journal type bearing capable of operating in atmospheric conditions with conventional lubrication means but which is further capable of automatically shifting to a magnetic bearing in outer space conditions when placed in an environment whereby the superconductive materials used in the construction of the spindle and the journal are made to become critical.

A third object of this invention is to provide a journal type bearing capable of normal operations in atmospheric conditions and which has an electromagnetic means for creating a flux field and trapping such flux field between the journal and the spindle when the bearing is used in outer space environments.

A fourth object of this invention is to provide a journal type bearing having a lubrication system capable of performing under normal atmospheric conditions while being further provided with a second system by having a permanent magnet disposed in a manner so as to create a flux field which can be trapped between the journal internal surface and the external surface of the spindle to provide a magnetic bearing when the temperature of said bearing is lowered below the critical temperature of the superconductor materials used therein.

These and other objects of the invention are achieved as is described in the following detailed description and figures, wherein:

FIGURE 1 is an exploded view of the permanent magnet bearing in perspective.

FIGURE 2 demonstrates the trapping and maintaining of a uniform magnetic flux field within a superconductor cylindrical member.

Figure 2:
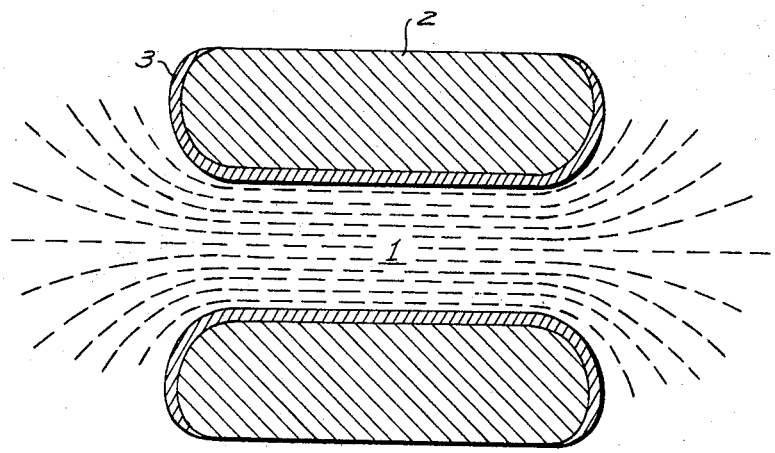

Reference is now directed to FIGURE 2. As has been briefly set forth hereinbefore a uniform magnetic field 1 is trapped within a substantially thick-walled cylinder 2. The internal surfaces and the ends of the cylinder are formed in a substantially toroidal manner and are coated with a superconducting material 3.

Figure 1:
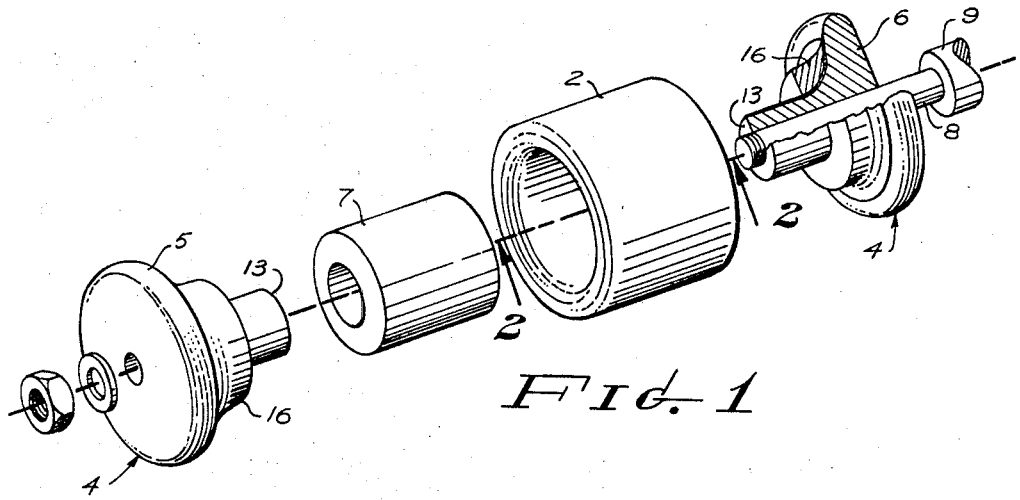
Figure 4:
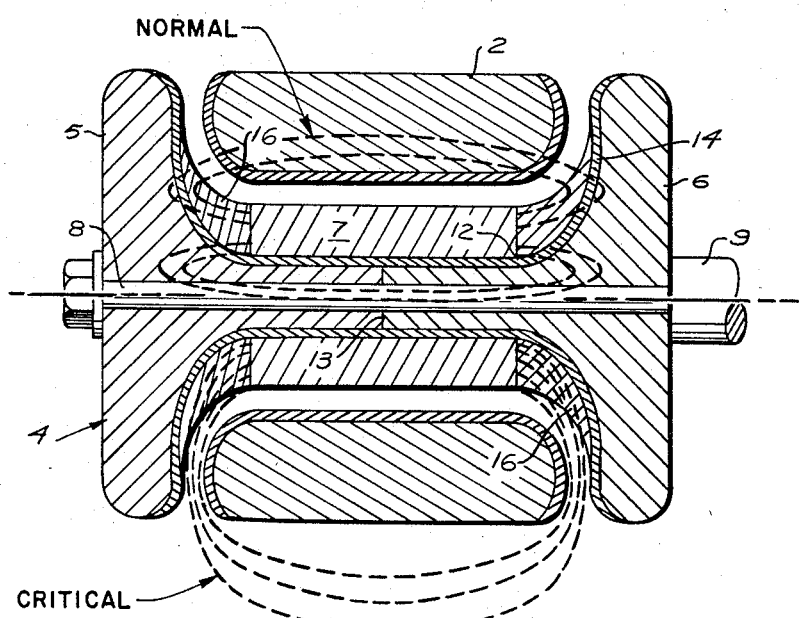
FIGURE 4 is a sectional view of the permanent magnet species of the bearing, in normal and critical condition.

Reference is now directed to FIGURES 1 and 4. The cylindrical member 2 serves as the journal of the bearing. A spool-like spindle arrangement 4 consists of a pair of end members 5 and 6 and a cylindrical permanent magnet 7 which are assembled by an assembly bolt 8 attached to a drive shaft 9. The internal surfaces of each of the end members 5 and 6 and a cylindrical permanent magnet 7 which are assembled by an assembly bolt 8 attached to a drive shaft 9. The internal surfaces of each of the end members 5 and 6 are contoured to a curvedness which conforms to the end portions and internal area of the journal member 2. The end members are substantially the same diameter as the journal member 2 at their outer ends and are diametrically reduced inwardly toward one another to a point 12 where they join with the outer ends of the permanent magnet 7. The continuing inwardly directed portions of the end members remain diametrically uniform from the point 12 to a point 13 where they join, substantially in the center of the spindle.

A coating of superconductor material 14 is disposed upon the internal surfaces of the spool adjacent to the internal surfaces of the journal member 2.

A pair of circular fillet-like spacer members 16 provide a smooth surface to the journal. These members are constructed of a non-superconducting material. These members are used to fill the recesses formed at the ends of the magnet between the ends thereof and the external walls of the spindle. It is necessary to fill these recesses with a material with good bearing characteristics because of the use of the bearing under normal conditions. The superconductor surfaces of the spool are formed in this manner so that the flux lines are not caused to make a right angle turn which would tend to cause high field concentration and the possible breakdown of the superconducting material at this critical point in the bearing.

In operation, the bearing can be used in a conventional manner with regular lubricants, either dry or liquid, when operating in an atmospheric environment. Without the necessity of physical change, the bearing can automatically shift to a magnetic bearing and operate in outer space conditions. Under outer space conditions, any liquid lubricant would be removed from the bearing by outgassing under the vacuum conditions of outer space and the operation would shift to a magnetic type bearing as the superconductor material becomes critical. The normal operation of the bearing in an outer space condition is as follows:

The superconducting material 14 covering the external surface of the spool would be of a nature that would go superconducting at a slightly higher temperature than the superconducting material of the journal 2 thus, in effect, causing the spindle to go critical first. When the material 14 goes critical, a substantially toroidal flux pattern is created by the magnet 7. When the superconducting material 3 on the internal surface of the journal 2 goes critical, the flux pattern is trapped between the surface 14 and the surface 3 in a uniform pattern so that the spindle then is riding on a cushion of magnetic flux thus holding the adjacent surfaces of the two members remote from one another. The spool-like formation of the spindle member provides means for adjusting both along the axis of the spindle as well as carrying the radial load of the spindle. Thus, as long as the field, which is trapped within the bearing, is a uniform field and the superconducting material used on the surfaces of the spindle and the journal are of respectively uniform resistance the bearing can be expected to operate as designed.

Figure 3:
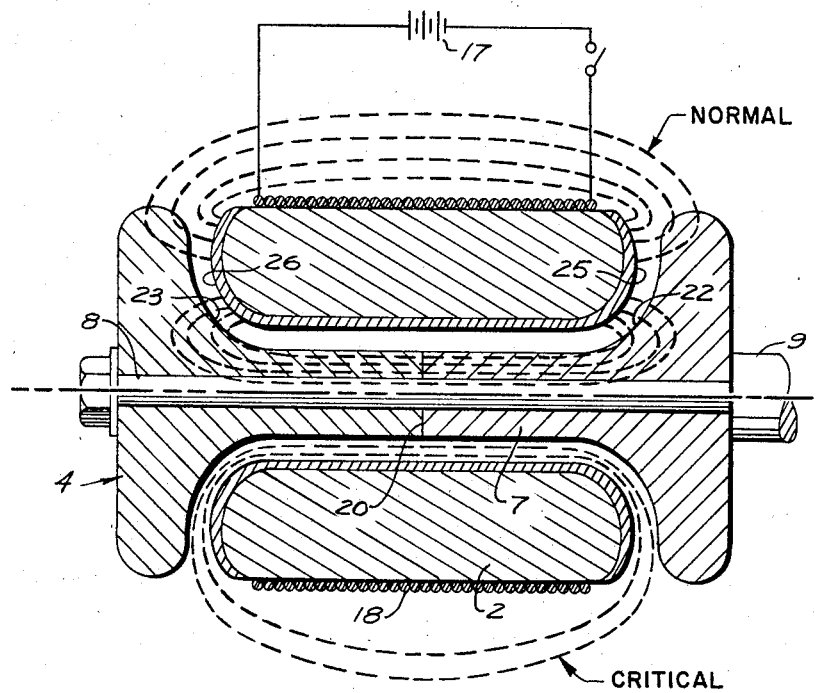
FIGURE 3 is a sectional view of the electromagnetic species of the bearing, in normal and critical condition.

Reference is now directed to FIGURE 3. The electromagnetic species of this invention can be shown in various ways but this illustration is apparently the most feasible. The same type journal member 2, as is described hereinbefore, is provided with a coil wrapping 18 disposed around its outer diameter thus using the journal itself as a core to provide a simple coil arrangement to create a toroidal flux field within and around the member when power is applied thereto.

Power means 17 is provided to energize the coil through a simple on-off switch.

The spool-like spindle member 7 in this case is a simple spool made of a single melt of superconductor material. After being formed, it is severed at a central point 20 to facilitate assembly within the journal 2. The necessity for using the same melt on the spool or journal member is due to the varied resistance or non-homogeneity within the individual melts of superconducting materials giving rise to the possibility that one end of the spool would have somewhat different resistance characteristic than the other and thus would not properly isolate itself from the journal. In other words, the balance of the thrust areas 22 and 23 may not take place thus causing one or the other end to drag the journal surfaces 25 or 26.

The same tie rod arrangement as is described hereinbefore is used to assemble the spindle and provide means for attaching it to a shaft 9 of a rotating member.

The operation of the electromagnetic species is slightly different. An important difference is that the spindle 7 should not go critical before the journal for best results. As will be remembered, this is the reverse of the permanent magnet species. It is known that if this was not accomplished, some of the flux lines would take the shortest path of return, doubling back between the adjacent surfaces of the two members and not following the preferred path around the journal member. The sharp turns these flux lines would take in doubling back would cause a highly concentrated magnetic field in the areas 22 and 25, and 23 and 26 thus causing the superconductor to become non-superconducting in these critical force supporting areas.

Besides the above described important difference, the operation is as follows: In the atmosphere, it is a conventionally lubricated bearing using grease or oil, or a dry lubricant. When in space or an environment wherein the superconductor goes critical, the lubricant is cleaned out of the bearing by air blast or by dissipation (outgassing under vacuum conditions). The power is turned on to energize the coil 18, setting up a flux field within the journal or core 2. The power must be left on until the journal member 2 goes critical. As has been pointed out hereinbefore, the spindle member goes critical last. This is controlled by the type of superconductor material used. When the spindle goes critical, it ejects all flux lines forcing them to follow its outer surfaces 22 and 23. The journal member 2 being in a critical state causes the trapping of the internal flux lines thus causing them to be compressed between the spindle external surfaces 22 and 23 and the journal internal surfaces 24 and 25, forming a highly concentrated flux pad between the two members and holding the spindle suspended from the internal surfaces of the journal in the same manner as described in the case of the permanent magnet bearing.

After the member 2 has gone superconducting, the power can be turned-off trapping and holding the flux field as described by Hildebrandt et al.

Although the present invention has disclosed only two basic arrangements, it is believed evident that it is possible to depart from these specific arrangements without departing from the invention disclosed herein. Furthermore, many combinations of the various featrues of the present invention may be made without the exercise of invention in the light of the present teachings. Accordingly, this invention is to be considered limited only by the following claims.

I claim:

1. A hybrid lubrication system and bearing comprising:
   (a) a first member consisting of a substantially thick-walled journal;
   (b) a second member consisting of a spool-like spindle rotatably disposed within said first member;
   (c) magnetic means capable of producing a toroidal magnetic flux field within said first member, disposed adjacent said bearing;
   (d) said first and said second members including materials capable of becoming superconducting, said materials being disposed on said members in a manner so as to trap said flux field between the adjacent surfaces thereof when said materials become critical thus suspending said second member within said first member; and
   (e) said second member being disposed within said first member in a manner so as to be adaptable to conventional lubrication methods.

2. A hybrid lubrication system and bearing comprising:
   (a) a first member consisting of a substantially thick-walled journal;
   (b) a second member consisting of a spool-like spindle rotatably disposed within said journal;
   (c) one of said members being provided with magnetic means capable of producing a toroidal flux field of concentrated magnetic flux;
   (d) said first and second members including materials capable of becoming superconducting, said materials being disposed therein in a manner so as to trap said flux field between the adjacent surfaces of said members when said materials go critical thus suspending said second member within said first member; and
   (e) said second member being disposed within said first member in a manner so as to be adaptable to conventional lubrication methods.

3. A hybrid lubrication system and bearing comprising:
   (a) a first member consisting of a substantially toroidal journal;
   (b) a second member consisting of a spool-like spindle assembly rotatably disposed within said first member, and including a cylindrical permanent magnet centrally disposed within said member in a manner so as to provide a substantially toroidal magnetic flux field within said bearing;
   (c) said first and second members including materials capable of becoming superconducting, said materials being disposed thereon in a manner so as to trap said flux field between the adjacent surfaces of said first and said second members when said superconducting materials go critical.

4. A hybrid lubrication system and bearing as described in claim 3 wherein: said superconducting material of said first member is adapted to go superconducting before said materials of said second member.

5. A hybrid lubrication system and bearing as described in claim 4 wherein: said second member is formed in a manner so that the external surface curvedness thereof conforms to the internal toroid shape of said first member providing a combination load, thrust arrangement within said bearing.

6. A hybrid lubrication system and bearing as described in claim 5 wherein: said superconducting material is deposited as a thin coating on the internal surfaces and ends of said first member in a manner so as to eject said flux from said journal effectively trapping a concentrated toroidal flux field therearound.

7. A hybrid lubrication system and bearing as described in claim 6 wherein: said second member consists of a pair of end members formed from a single melt of superconducting material and being adapted to hold a cylindrical permanent magnet centrally disposed therebetween, the internal ends of said end members extending into said magnet and joining at a central point therein, said second member being assembled by a tie rod centrally disposed therethrough.

8. A hybrid lubrication system and bearing comprising:
   (a) a first member consisting of an elongated, substantially toroidal journal;
   (b) a conducting coil disposed on said first member in a manner so as to create a toroidal flux field therein and power means for energizing said coil;
   (c) a second member consisting of a spool-like spindle rotatably disposed within said first member;
   (d) said first and said second members including materials capable of becoming superconducting, said materials so disposed so as to trap said flux field between the adjacent surfaces of said members when said materials go critical thereby causing a flux cushion therebetween thus holding said spindle remote from said journal.

9. A hybrid lubrication system and bearing as described in claim 8 wherein: said superconducting material included in said second member is of a nature which becomes critical at a lower temperature than said superconducting materials included in said first member.

10. A hybrid lubrication system and bearing as described in claim 9 wherein: said second member consists of a pair of end members formed of a single melt of superconducting material, said members being formed in a manner so as to have an outside curvedness conforming to the internal surface and end walls of said first member.

11. A hybrid lubrication system and bearing as described in claim 10 wherein: said first member is formed substantially of a conductive material whereby it may act as a core for said coil.

12. A hybrid lubrication system and bearing as described in claim 11 wherein: said coil winding is disposed upon the external circumferential surface of said journal in a plane perpendicular to the axis thereof.

References Cited

UNITED STATES PATENTS

| 2,704,231 | 3/1955 | Goldsmith | 308—10 |
| 3,026,151 | 3/1962 | Buchhold | 308—10 |
| 3,098,181 | 7/1963 | Cioffi | 335—216 |
| 3,109,963 | 11/1963 | Geballe | 335—216 |
| 3,234,435 | 2/1966 | Hempstead et al. | 335—216 |
| 3,253,193 | 5/1966 | Lubell et al. | 335—216 |

J. A. O'BRIEN, R. MURRAY, Assistant Examiners.

L. L. SMITH, Assistant Examiner.